United States Patent [19]
Kennon

[11] 4,158,864
[45] Jun. 19, 1979

[54] FAULT CURRENT LIMITER

[75] Inventor: Richard E. Kennon, Sunnyvale, Calif.

[73] Assignee: Electric Power Research Institute, Inc., Palo Alto, Calif.

[21] Appl. No.: 812,723

[22] Filed: Jul. 5, 1977

[51] Int. Cl.$^2$ .............................................. H02H 3/08
[52] U.S. Cl. ....................................... 361/58; 361/113
[58] Field of Search .................... 361/58, 113, 52, 16, 361/15; 307/129, 134, 135

[56] References Cited

U.S. PATENT DOCUMENTS

| | | | |
|---|---|---|---|
| 2,202,716 | 5/1940 | Partington | 361/58 X |
| 3,047,746 | 7/1962 | Berkery | 361/58 |
| 3,356,900 | 12/1967 | Kalkner | 361/58 |
| 3,356,901 | 12/1967 | Kramer et al. | 361/58 |
| 3,418,532 | 12/1968 | Becker | 361/113 |
| 3,436,600 | 4/1969 | Salo | 361/58 |
| 3,487,264 | 12/1969 | Cure | 361/35 |
| 3,529,210 | 9/1970 | Ito et al. | 361/58 |
| 3,573,549 | 4/1971 | Wolf | 361/58 X |
| 3,646,397 | 2/1972 | Ruthenberg et al. | 361/52 X |
| 3,711,759 | 1/1973 | Krauthamer | 361/58 X |
| 3,745,416 | 7/1973 | Thanawala | 361/58 |

*Primary Examiner*—Patrick R. Salce

*Attorney, Agent, or Firm*—Flehr, Hohbach, Test, Albritton & Herbert

[57] ABSTRACT

A current limiting network is connected in a power line between an AC power supply and a load, and has a pair of series connected resonant branch circuits, each of which include a capacitance and an inductance tuned to the power supply frequency. Under normal operation virtually no impedance is offered by the network. Each branch circuit has a circuit node between the capacitor and inductor contained therein. A switch, having a resistance in series therewith, is connected between the circuit nodes in the branch circuits. The branch circuits are connected in parallel, and a resistance is connected in parallel with the branch circuits. The switch is responsive to a fault current in the power system and when actuated, detunes the series resonant branch circuits to thereby present a high impedance to the power line. The parallel resistance reduces the level of any transient surges and the time of any oscillation appearing on the capacitors when the switch is actuated by a fault current. Another embodiment selectively suppresses transients and reduces oscillation on the branch circuit capacitors.

4 Claims, 3 Drawing Figures

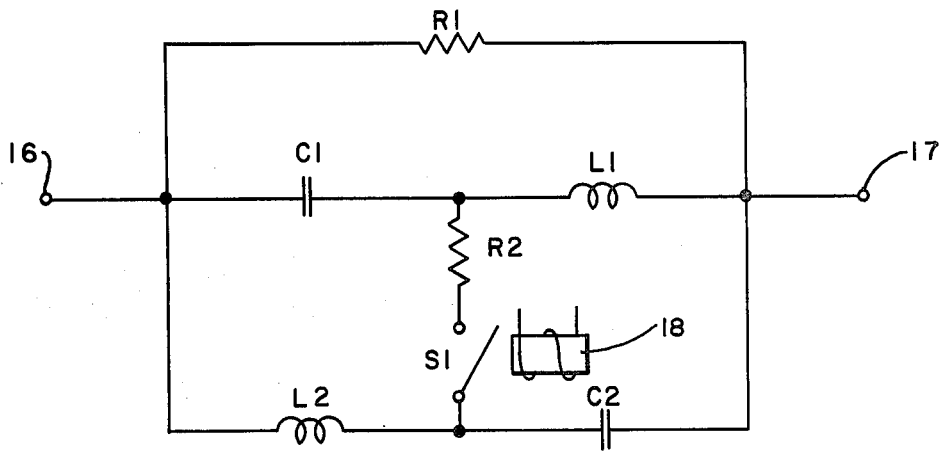
FIG.—2
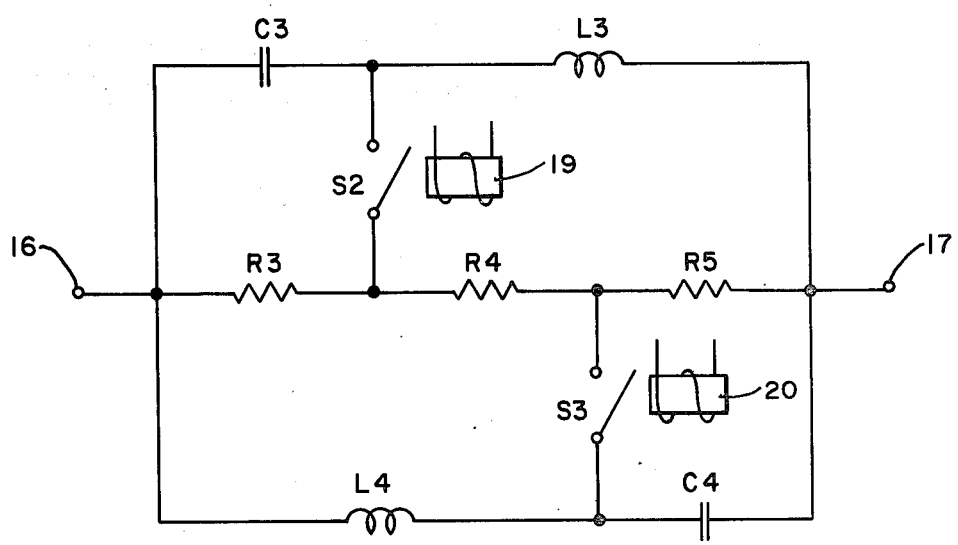
FIG.—3
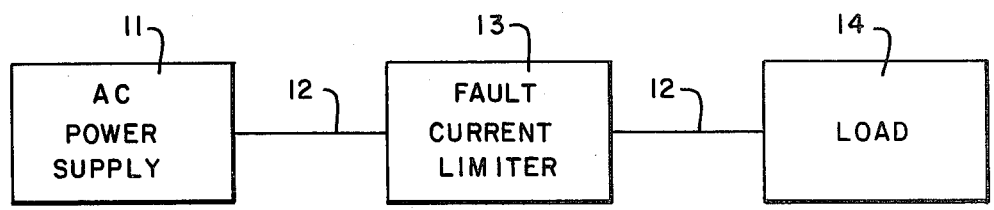
FIG.—1

FAULT CURRENT LIMITER

BACKGROUND OF THE INVENTION

This invention relates to current limiting circuits, and more particularly to such circuits for use in AC power lines.

Circuits are known for use in AC power systems which are tuned to series resonance at the AC power frequency, and which are detuned in response to a fault current on the AC power line to afford a high impedance in the line and subsequent current limiting. A number of such circuits are shown in U.S. Pat. No. 3,418,532, issued to Becker. In FIG. 2 of the Becker patent a pair of series resonant inductive-capacitive circuit legs are shown connected in parallel, having a cross leg between the circuit nodes connecting the inductors and capacitors in each of the parallel legs. The cross leg contains a saturable choke $X_S$ in series with a resistor R. In normal operation the saturable choke presents a high impedance between the nodes, and the series resonant legs present substantially no resistance to the flow of current. When a fault current creates a voltage across the saturable choke, the choke is driven into saturation rendering it highly conductive and detuning the series inductive capacitive legs. Subsequent current flow through the circuit, when detuned, is limited by the resistance R to a safe value. Oscillation prevention is also provided by resistance R. However, the Becker disclosure, as well as all other known references, allows the voltage across the capacitors to increase momentarily to a very high level when the saturable choke assumes a conductive condition upon the occurrence of a fault. Building capacitors to withstand this momentary high voltage is quite costly, and renders any resulting circuit module very bulky. A short circuit limiting network having small volume is desirable which provides fault current protection in an AC power system, and at the same time provides protection for the network itself.

SUMMARY AND OBJECTS OF THE INVENTION

A current limiting circuit is disclosed for insertion in a power line between an AC power source and the load which includes first and second series resonant branch circuits each having a capacitor and an inductor therein, and each being tuned to the AC power frequency. Connection between the capacitor and the inductor in each branch circuit is made at a common circuit node therebetween. Consequently, substantially no impedance is offered to the power line by the branch circuits at resonance. Switching means is connected between the common circuit nodes in the branch circuits. The switching means is responsive to a fault current in the power line and operates, when actuated, to detune the branch circuits, and thereby offer a high impedance and subsequent limiting of the fault current in the power line. Resistance connected in parallel with the capacitors operates to reduce switching transients and voltage oscillations thereacross.

In general, it is an object of the present invention to provide an improved fault current limiter which reduces the level of switching transients and voltage oscillations in the limiting network.

Another object of the present invention is to provide an improved fault current limiter which specifically protects, and therefore reduces the size and required capability of capacitors contained in the limiting circuit.

Another object of the present invention is to provide an improved fault current limiter which provides damping and reduction in electrical oscillation subsequent to switching.

Additional objects and features of the invention will appear from the following description in which the preferred embodiment has been set forth in detail in conjunction with the accompanying drawings.

BRIEF DESCRIPTION OF THE DRAWINGS

FIG. 1 is a block diagram showing the fault current limiter included in an AC power system.

FIG. 2 is an electrical schematic diagram showing one embodiment of the fault current limiter.

FIG. 3 is an electrical schematic diagram showing another embodiment of the fault current limiter.

DESCRIPTION OF THE PREFERRED EMBODIMENTS

A rudimentary AC power system is shown in FIG. 1 including an AC power supply 11 coupled to a power line 12 in which is contained a fault current limiter 13. Power line 12 is coupled to a load 14 to be energized by power supply 11.

Turning now to FIG. 2, a pair of branch circuits are shown, the first of which includes the series combination of capacitor C1 and inductor L1, and the second of which includes the series combination of inductor L2 and capacitor C2. The inductor and capacitor elements are chosen to provide series resonance at the AC power supply frequency, and consequent minimal impedance between terminals 16 and 17 shown thereon when coupled to power line 12. A circuit node is shown between capacitor C1 and inductor L1 and another circuit node is shown between inductor L2 and capacitor C2. A resistor R2, in series with a switch S1, is shown connected between the aforementioned nodes in the two branch circuits. A resistor R1 is connected in parallel with both of the two branch circuits.

It is clear that under normal operating conditions with switch S1 in an open condition, line current may pass between terminals 16 and 17 essentially unimpeded when the inductive reactance and capacitive reactance are equivalent in each branch circuit. This is a condition of series resonance.

Switch S1 is sensitive to fault current and may be any one of a number of appropriate devices, such as a saturable reactor, a silicon controlled rectifier, a relay, spark gap or the like. Switch S1 is shown in FIG. 2 to be actuated by relay 18. Under fault conditions switch S1 is closed. Ordinarily when switch S1 is closed the voltage across capacitors C1 and C2 would increase momentarily to an extremely high level. However, resistor R1 reduces the voltage which may appear across the entire network terminals 16 and 17 during the occurrence of a fault in the AC system. Further, oscillations induced by the closing and opening of switch S1 are damped by both resistors R1 and R2.

Inductors L1 and L2 may be air core devices, which inherently have a high over-voltage capability without increased cost of manufacture. As a consequence, the embodiment of FIG. 3 is feasible, wherein the switching transients and oscillations on capacitors C3 and C4 are lowered selectively. As in FIG. 2 above, a pair of parallel connected branch circuits including capacitor C3 and inductor L3 in one branch, and inductor L4 and capacitor C4 in another branch, are tuned to the AC power supply frequency to provide series resonance and minimal impedance between terminals 16 and 17 during normal operation. Capacitor C3 and inductor L3 have a circuit node therebetween. A voltage divider including resistors R3, R4 and R5, is connected in parallel with the two resonant branch circuits containing capacitor-inductor combinations C3/L3 and L4/C4. A normally open switch S2 is connected between the circuit node which is common to capacitor C3 and inductor L3 and the junction between resistors R3 and R4 in the voltage divider. Another normally open switch S3 is connected between the circuit node located between inductor L4 and capacitor C4 and the junction between resistors R4 and R5 in the voltage divider.

Switches S2 and S3 are both sensitive to fault currents in AC power line 12, and are shown in FIG. 3 to be actuated by relays 19 and 20 respectively, which are energized when a fault current is present in the circuit. Terminals 16 and 17 are coupled to AC power line 12 and switches S2 and S3 are positioned to a closed position in response to such fault currents. Resistors R3 and R5 in the voltage divider or multi-element resistor containing R3, R4 and R5 do not carry much, if any, current during normal operating conditions with switches S2 and S3 open, because the two branch circuits containing C3/L3 and L4/C4 present essentially zero impedance at the power system frequency. There is, therefore, no voltage drop across the multi-element resistor. In the event there is some small amount of current through resistors R3, R4 and R5 during normal operations, a spark gap (not shown) may be placed in series therewith.

A fault current will cause switches S2 and S3 to close, thereby detuning the series resonant branch circuits containing C3/L3 and L4/C4. The impedance between terminals 16 and 17 rises to a high value as the series resonant branch circuits are detuned. The voltage divider effect at the junction between resistors R3 and R4 will reduce the steady state voltage across capacitors C3. Voltage division at the junction between resistors R4 and R5 will reduce the steady state voltage across capacitor C4. Further, the value of resistors R3 and R5 should be chosen so that the time constants of the combinations R3/C3 and R5/C4 is much less than one-half the period of one power cycle. This will provide network damping which will prevent short time voltage buildup across capacitors C3 and C4 due to network signal oscillation.

The resistors in the embodiments of FIG. 2 and FIG. 3 may be linear or non-linear. Non-linear, or voltage dependent resistors, such as those made of silicon carbide or zinc oxide, may more efficiently protect the capacitors in the networks of FIGS. 2 and 3.

An improved fault current limiter providing controlled impedance to an AC power line has been disclosed, which provides protection for capacitor elements in the limiter circuit. The capacitors may therefore be less costly, and occupy less volume due to the lower voltage rating required.

What is claimed is:

1. An electrical circuit connected in a line between an AC power source and a load for limiting fault current in the load, comprising first and second parallel connected paths each containing a series connected inductance-capacitance combination tuned to resonate at the AC power frequency, means comprising first and second series connected switches connected between the common inductance-capacitance nodes in said first and second parallel paths being actuated to a conducting condition by fault current, whereby said first and second paths are detuned and provide a high impedance in the line, and means for limiting the voltage across each capacitance in said first and second parallel paths, whereby the magnitude of switching transients across each capacitance is limited, said means for limiting comprising a multi-element resistor connected in parallel with said first and second parallel paths, said first and second switches operating to connect a first and second resistor in said multi-element resistor in parallel with the capacitance in said first and second parallel paths respectively.

2. A current limiting circuit for insertion in a power line between an AC power source and a load, comprising first and second series resonant branch circuits, a capacitor and an inductor in each of said branch circuits tuned to the AC power frequency, and having a common circuit node therebetween, whereby substantially no impedance is offered to the power line by the branch circuits at resonance, means for switching connected between said common circuit nodes in said first and second branch circuits, said means for switching being actuated in response to a fault current in the power line, and operating when actuated to detune said first and second branch circuits, whereby high impedance occurs and fault current in the power line is limited, and a resistance in parallel with each of said capacitors, whereby switching transients and voltage oscillations thereacross are reduced, said resistance comprising a voltage divider, first and second junctions on said voltage divider, said means for switching comprising a first switch connected between said common node in said first branch circuit and said first junction, and a second switch connected between said common node in said second branch circuit and said second junction.

3. A current limiting circuit as in claim 2 wherein said resistance includes at least one non-linear resistor.

4. A current limiting circuit as in claim 2 wherein the resistance-capacitance time constant of the resistance in said voltage divider in parallel with each of said capacitors is substantially less than one half period of the power frequency.

* * * * *